United States Patent
Hu et al.

(10) Patent No.: US 7,054,339 B1
(45) Date of Patent: May 30, 2006

(54) FIBER-LASER-BASED TERAHERTZ SOURCES THROUGH DIFFERENCE FREQUENCY GENERATION (DFG) BY NONLINEAR OPTICAL (NLO) CRYSTALS

(75) Inventors: Yongdan Hu, Tucson, AZ (US); Shibin Jiang, Tucson, AZ (US)

(73) Assignee: NP Photonics, inc, Tucson, AZ (US)

( * ) Notice: Subject to any disclaimer, the term of this patent is extended or adjusted under 35 U.S.C. 154(b) by 105 days.

(21) Appl. No.: 10/890,580

(22) Filed: Jul. 13, 2004

(51) Int. Cl.
*H01S 3/115* (2006.01)

(52) U.S. Cl. ........................................ 372/12
(58) Field of Classification Search ............ 372/12
See application file for complete search history.

(56) References Cited

U.S. PATENT DOCUMENTS

| | | | |
|---|---|---|---|
| 5,663,639 A | | 9/1997 | Brown et al. ............... 324/96 |
| 5,729,017 A | * | 3/1998 | Brener et al. ............ 250/338.1 |
| 5,991,316 A | * | 11/1999 | Kikuchi ..................... 372/21 |

(Continued)

OTHER PUBLICATIONS

Hatanaka et al. Tunable terahertz-wave generation from DAST crystal by dual signal-wave parametric oscillation of periodically poled lithium niobate. Optics Letters. vol. 25. No. 23. Dec. 1, 2000. pp. 1714-1716.*

B.B Hu et al., Imaging with terahertz waves, Optics Letters, vol. 20, No. 16, Aug. 15, 1995, pp. 1716-1719.

E.R. Brown et al., Coherent millimeter-wave generation by heterodyne conversion in low-temperature-grown GaAs photoconductors, J. Appl. phys. 73(3), Feb. 1993, pp. 1480-1484.

Thomas W. Crowe et al., GaAs Devices and Circuits for Terahertz Applications, WE1D-3, IEEE 1999, pp. 929-932.

Lawrence Ives et al, Development of Efficient Backward Oscillators for Submillimeter Applications, P2.27.

Rudeger Kohler et al., Terahertz semiconductor-heterostructure laser, Nature, vol. 417, May 9, 2002, pp. 156-159.

Daniel M. Mittleman et al., T-Ray Imaging, IEEE Journal of Selected Topics in Quantum Electronics, vol. 2, No. 3, Sep. 1996, pp. 679-692.

(Continued)

*Primary Examiner*—Deandra M. Hughes
(74) *Attorney, Agent, or Firm*—Eric A. Gifford

(57) ABSTRACT

A fiber-laser-based implementation of a Terahertz source through difference frequency generation (DFG) by nonlinear optical (NLO) crystals is compact, tunable and scalable. A pair of fiber lasers (Q-switched, CW or mode-locked) generate single-frequency outputs at frequencies $\omega 1$ and $\omega 2$. A fiber beam combiner combines the laser outputs and routes the combined output to a THz generator head where a nonlinear interaction process in the NLO crystal generates THz radiation.

17 Claims, 5 Drawing Sheets

U.S. PATENT DOCUMENTS

| | | |
|---|---|---|
| 6,295,304 B1 * | 9/2001 | Koch et al. .................... 372/6 |
| 6,738,397 B1 | 5/2004 | Yamamoto et al. ........... 372/21 |
| 2005/0018714 A1 * | 1/2005 | Fermann et al. ............... 372/6 |

OTHER PUBLICATIONS

Eric R. Mueller, 2.5 THZ Laser Local Oscillator for the EOS Chem 1 Satellite, Proceedings of the Ninth International Symposium on Space Terahertz Technology, 1998, p. 563.

Patrick G. O'Shea et al., Free-Electron Lasers: Status and Applications, Science, vol. 292, Jun. 8, 2001, pp. 1853-1858.

Michel Rochat et al., Low-threshold terahertz quantum-cascade lasers, Applied Physics Letters, vol. 81, No. 8, Aug. 19, 2002, pp. 1381-1383.

Wei Shi et al., Efficient, tunable, and coherent 0.18-5.27-THz source based on GaSe crystal, Optics Letters, vol. 27, No. 16, Aug. 15, 2003, pp. 1454-1456.

S. Verghese et al., Highly Tunable Fiber-Coupled Photomixers with Coherent Terahertz Output Power, IEEE Transactions on Microwave Theory and Techniques, vol. 45, No. 8, Aug. 8, 1997 pp. 1301-1309.

* cited by examiner

FIBER-LASER-BASED TERAHERTZ SOURCES THROUGH DIFFERENCE FREQUENCY GENERATION (DFG) BY NONLINEAR OPTICAL (NLO) CRYSTALS

BACKGROUND OF THE INVENTION

1. Field of the Invention

This invention relates to Terahertz sources and more specifically to a fiber-laser-based Terahertz source through difference frequency generation (DFG) by nonlinear optical (NLO) crystals.

2. Description of the Related Art

Terahertz (THz) sources are finding widespread applications because of their unique absorption or transparency in different materials. Based on their unique absorption lines in many chemical and biological materials, THz sources are very useful in medical imaging and diagnostics (such as oncology, cosmetics, and dental cares), and pharmaceutical applications (such as drug discovery and formulation, and proteomics). THz sources are used in non-destructive testing and security screening because of the capability of the source to see through various materials such as plastics, cardboard and semiconductors. THz sources are also used in military sensing and imaging.

Several technologies have been used to generate THz sources. P. G. O'Shea et al, *Science*, (2001) describe a free-electron laser that can produce very high-power THz radiation. R. Kohler et al, *Nature*, (2002) and M. Rochat et al, *Appl. Phys. Lett.* (2002) describe a THz source based on cascaded quantum wells. E. R. Brown et al, *J. Appl. Phys.* (1993) and S. Verghese et al, *IEEE Trans. Microwave Theory Tech.* (1997) describes a THz source that uses a photomixer. E. R. Mueller et al, *Proceedings of the Ninth International Symposium on Space Terahertz Technology*, (1998) describes an optically pumped terahertz sources that use long-wavelength IR lasers such as $CO_2$ laser to pump a low-pressure molecular gas such as methanol. L. Ives et al, *Vacuum Electronics Conference*, 2000 describe a backward wave oscillator THz source. T. W. Crowe et al, IEEE MTT Micro. Symp. Dig., (1999) describe a direct multiplied (DM) THz source. B. B. Hu et al, *Opt. Lett.*, (1995) and D. M. Mittleman et al, *IEEE J. Slect. Topics Quantum Electron.* (1996) describe THz sources for time-domain spectroscopy that are based on electromagnetic transients generated opto-electronically with the help of femtosecond laser pulses.

Recently another technique based on nonlinear difference-frequency generation (DFG) in nonlinear optical (NLO) crystals has been receiving attention (W. Shi et al, *Opt. Lett.* (2002); S. Yamamoto et al., U.S. Pat. No. 6,738, 397). THz sources generated by DFG are coherent and can be widely tunable. However, the size, weight and integration of the reported free-space implementations are an impediment to commercial success. Each of the approaches mentioned above has one or more of the following disadvantageous features: (1) bulky in size and not portable, (2) requires cryogenic cooling, (3) low output power, difficult to scale to high power, (4) spatial incoherent beam, cannot have diffraction-limited output, and (5) no spectral agility.

To meet the growing demand for THz sources, a new technology or innovative implementation of an existing technology is needed that provides for a compact, lightweight, tunable, high power THz source that doesn't require cryogenic cooling. This source would preferably be capable of generating a diffraction-limited output beam as well.

SUMMARY OF THE INVENTION

The present invention provides an integrated DFG THz source that is capable of scaling in both output power level and number of output channels. The source is also tunable over a wide range, capable of generating a diffraction-limited output and does not require cryogenic cooling.

This is accomplished with a fiber-laser-based implementation of a Terahertz source through difference frequency generation (DFG) by nonlinear optical (NLO) crystals. A pair of fiber lasers (CW, Q-switched or mode-locked) generate single-frequency outputs at frequencies w1 and w2. A fiber beam combiner combines the laser outputs and routes the combined output to a THz generator head where a nonlinear interaction process in the NLO crystal generates THz radiation that is output from the head. The beam combiner includes a pair of input fibers that are spliced to the fiber lasers and an output fiber that is spliced to the generator head's fiber pigtail. If needed, a fiber amplifier is spliced between the beam combiner and generator head to amplify the combined signal so that the total THz output power will be correspondingly boosted. The insertion of a 1×N fiber splitter in the optical path scales the THz source to N channels. This "all-fiber" solution from the pump lasers to the generator head produces a very compact, lightweight and cost effective THz source.

These and other features and advantages of the invention will be apparent to those skilled in the art from the following detailed description of preferred embodiments, taken together with the accompanying drawings, in which:

DETAILED DESCRIPTION OF THE INVENTION

The present invention provides an integrated DFG THz source that is capable of scaling in both output power level and number of output channels. The compact and lightweight THz source is tunable over a wide range, capable of generating a diffraction-limited output and does not require cryogenic cooling.

Figure 1:
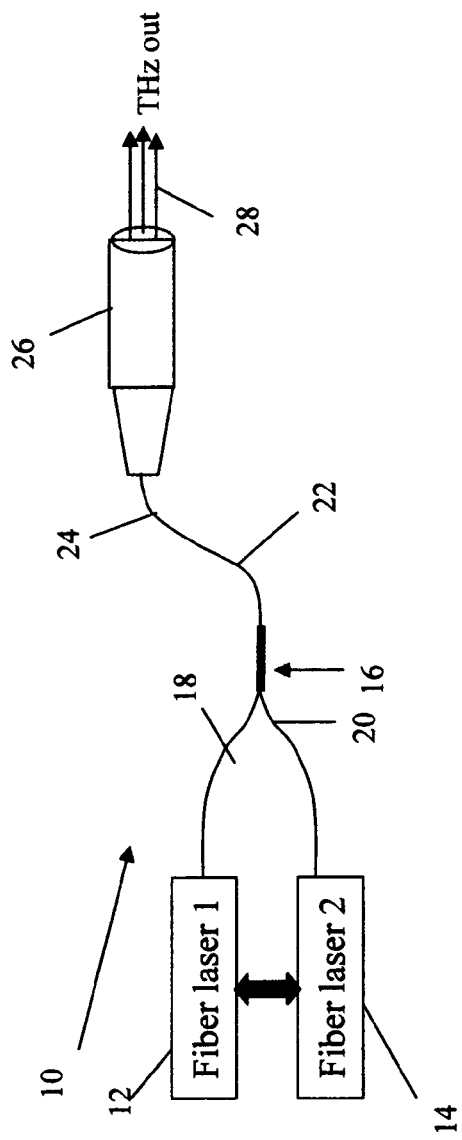
FIG. 1 is a diagram of a fiber-laser-based Terahertz source.

This is accomplished with a fiber-laser-based implementation of a Terahertz source 10 through difference frequency generation (DFG) by nonlinear optical (NLO) crystals such as GaAs or GaSe as shown in FIG. 1. A pair of fiber lasers 12 and 14, suitably CW, Q-switched or mode-locked, generate single-frequency outputs at frequencies $\omega_1$ and $\omega_2$. A fiber beam combiner 16 includes a pair of input fibers 18 and 20 that are spliced to the fiber lasers and an output fiber 22 that is spliced to a fiber pigtail 24 of a THz generator head 26. The fiber beam combiner combines the laser outputs and routes the combined output to the THz generator head 26 where a nonlinear interaction process in the NLO crystal generates THz radiation 28 that is output from the head. This "all-fiber" solution from the pump lasers to the generator head produces a very compact, lightweight and cost effective THz source.

Figure 2:
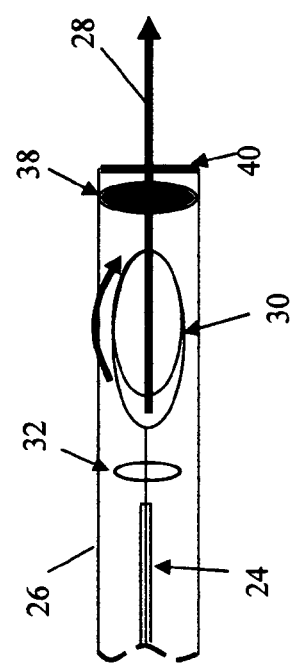
FIG. 2 is a diagram of a typical generator head.
Figure 3:
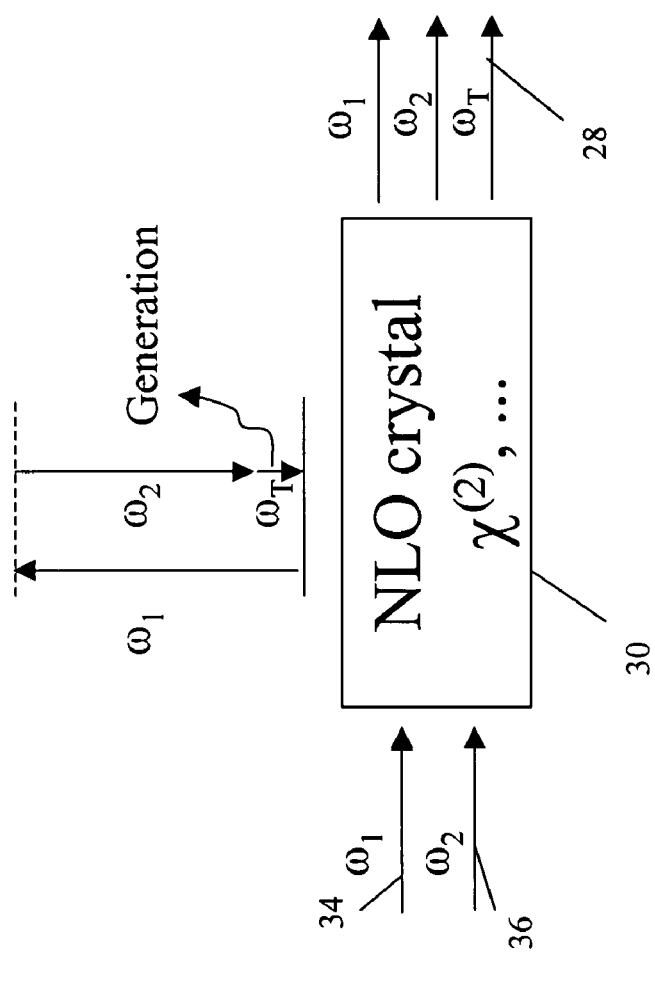
FIG. 3 is a diagram of difference-frequency generation (DFG) using a nonlinear optical (NLO) crystal.

As shown in FIG. 2, inside the THz generator head 26, the combined laser output is coupled from fiber pigtail 24 to a nonlinear optical (NLO) crystal 30 through a fiber collimator 32. As illustrated in FIG. 3, the difference frequency generation is a second-order nonlinear process through second-order susceptibility of the NLO crystal 30. The two input beams 34 and 36 with frequencies $\omega 1$ and $\omega 2$ ($\omega 1 > \omega 2$ with the difference within terahertz region) may have different polarization orientations relative to the optical axis of the NLO crystal so that they have same optical propagation indices to achieve phase matching. Quasi-phase matching can also be implemented by periodically-poled crystal such as PPLN. During the process, each $\omega 1$ being annihilated will be accompanied by one $\omega 2$ and one $\omega T = \omega 1 - \omega 2$ being generated coherently. The THz radiation 28 at frequency $\omega T$ is passed through another collimator 38 and an output window 40 to filter out residual w1 and w2.

Figure 4:
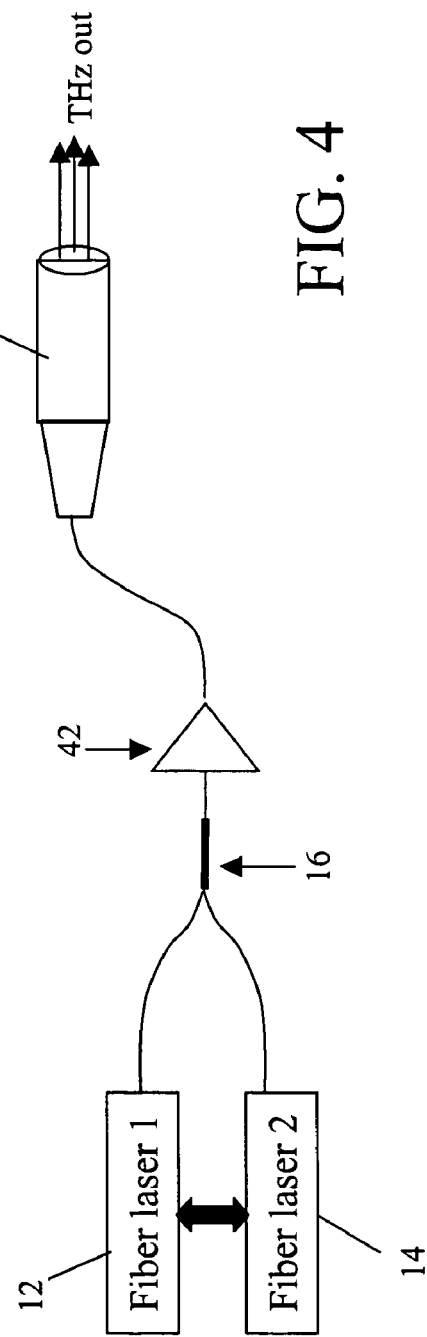
FIG. 4 is a diagram of a fiber-laser-based Terahertz source with power boosted by a fiber amplifier.

As shown in FIG. 4, the THz source 10 is well suited to scale in power to meet future power requirements. If needed, a fiber amplifier 42 is spliced between the beam combiner 16 and generator head 26 to amplify the combined signal. As a result, the total THz output power will be correspondingly boosted.

Figure 5:
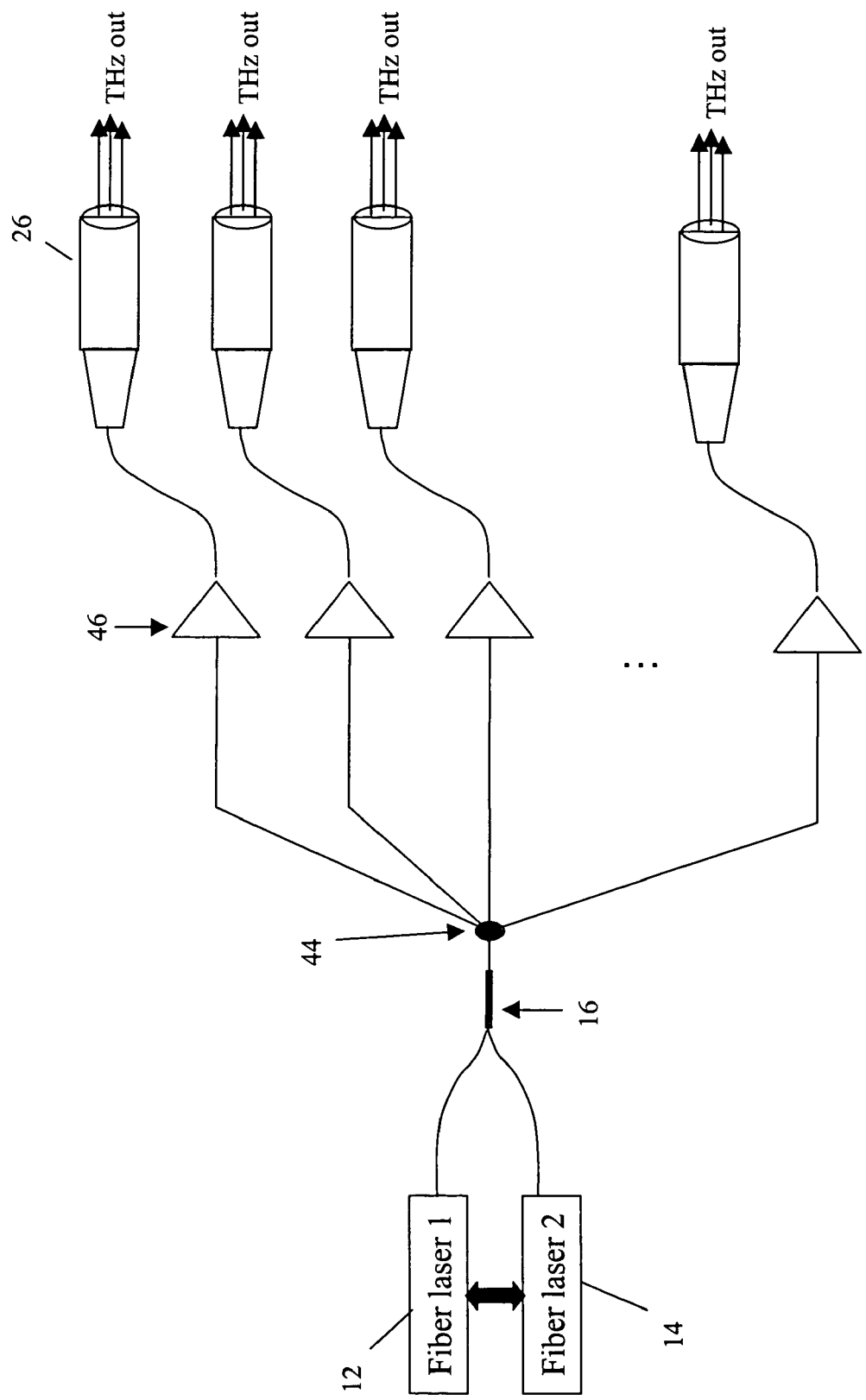
FIG. 5 is a block diagram of an all-fiber Terahertz source array.

As shown in FIG. 5, the THz source 10 is well suited to be scaled to a THz source array. The insertion of a 1×N fiber splitter 44 in the optical path after beam combiner 16 scales the THz source to N channels. A fiber amplifier 46 is spliced between the fiber splitter and the THz generator head 26 in each channel to amplify the combined signal.

Figure 6:
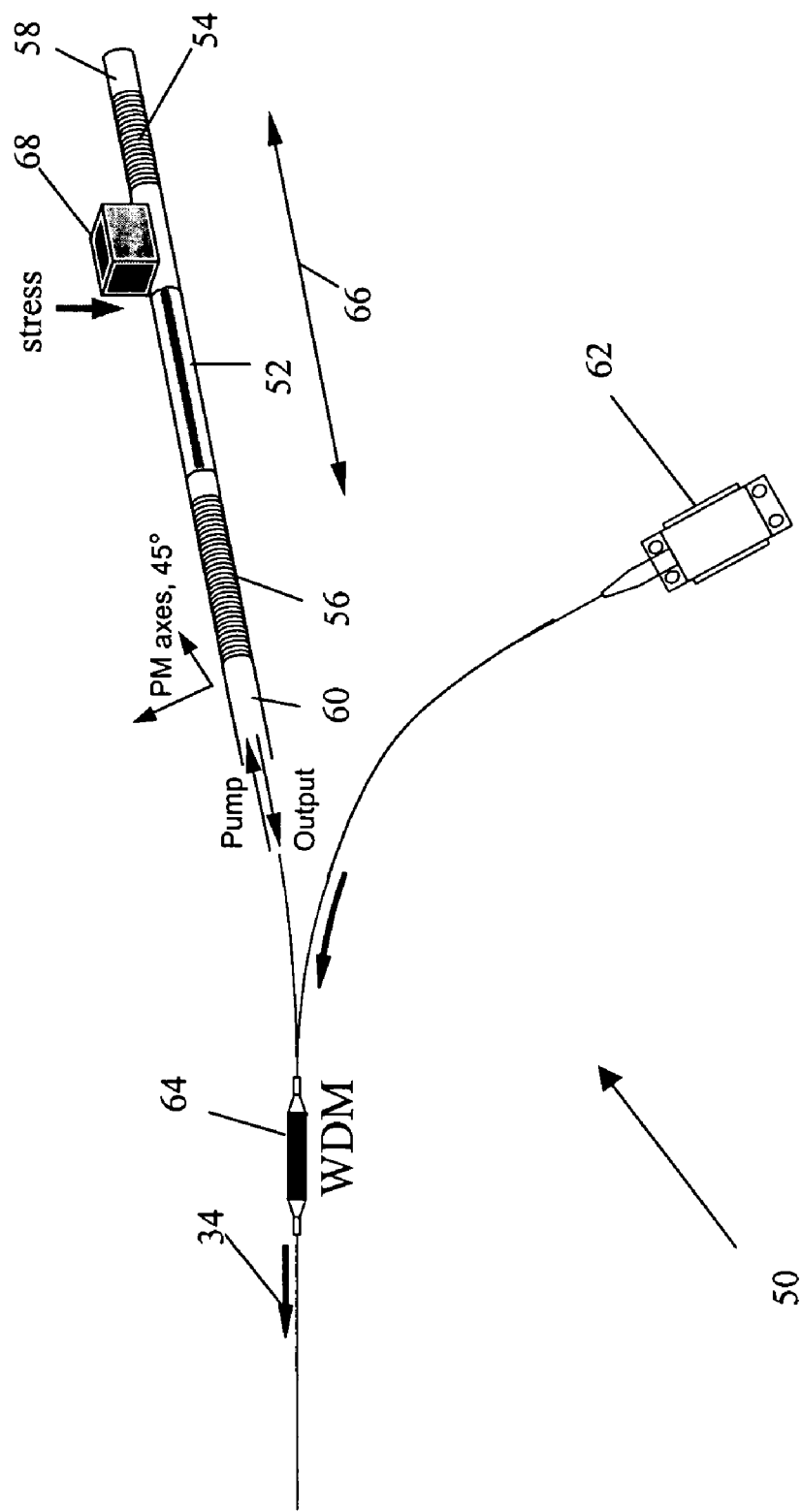
FIG. 6 is a diagram of a single-frequency Q-switched fiber laser.

Implementation of the fiber lasers 12 and 14 as an all fiber Q-switched laser resonator 50 of the type shown in FIG. 6 effectively increases the peak power of the THz radiation. A full presentation of the Q-switched fiber laser is given in copending U.S. patent application Ser. No. 10/665,032 entitled "All-Fiber Q-switched Laser", filed on Sep. 16, 2003, which is hereby incorporated by reference.

A typical 1.55 micron (or other C-band wavelength) Q-switched laser 50 consists of an Er/Yb-codoped phosphate glass fiber 52 that is less than 10 cm and suitably 2–5 cm in length spliced between a pair of silica-based fiber Bragg gratings (FBGs) 54 and 56. Owing to the high solubility, the phosphate glass allows high doping concentration of active ions, enabling an efficient laser with active fibers only a few centimeters long. One FBG 54 has high reflectivity (HR) and is imprinted on a standard silica fiber 58. The other FBG 56 or output coupler with R ranging from 10% to 80% is formed on a polarization-maintaining (PM) fiber 60, splitting the reflection wavelength for different polarizations, each having approximately 10 GHz of bandwidth. The laser is suitably pumped by a fiber-pigtailed, single-mode, 976-nm diode 62 for telecommunication applications. The pump light is coupled to the laser cavity through the output coupler 56, which is spliced to a WDM coupler 64 to separate the pump from the laser output 34.

The reflection band of the high reflector 54 is matched to only one of the reflection bands of the output coupler 56, making the laser cavity 66 polarization dependent. The HR-FBG 54 on standard fiber 58 is cleaved and spliced at a few millimeters away from the FBG, leaving room to be stressed to produce birefringence. The longitudinal mode spacing is 2.5–3 GHz, therefore there are only a few longitudinal modes supported in the reflection band of the output coupling FBG 56. Single-frequency operation can be maintained by proper adjustment of the temperature of the FBGs as well as the entire cavity.

Spectral tuning of the laser cavity can be realized by adjusting the temperatures of the FBGs as well as the whole laser cavity or by stretching the whole laser cavity through a PZT actuator. To modulate the loss internal to the resonator, a PZT actuator 68 was clamped on fiber 58 to apply stress from the side of the fiber in the section between the splice and the high-reflection FBG, introducing the birefringence in the fiber. Because of the polarization dependence of the resonator, the loss of the resonator can be modulated. To maintain high contrast in the loss-modulation, the orientation of the stress was keyed at 45 degrees with respect to the slow/fast axes of the PM fiber 60.

A 1-micron laser can be implemented by doping the glass with Yb only. This will provide broad wavelength options for difference frequency generation. For THz applications, research should focus on Q-switching the laser for video-rate operation, increasing pulse energy, optimizing the active fiber to handle higher energy stored in the cavity and so on.

Figure 7:
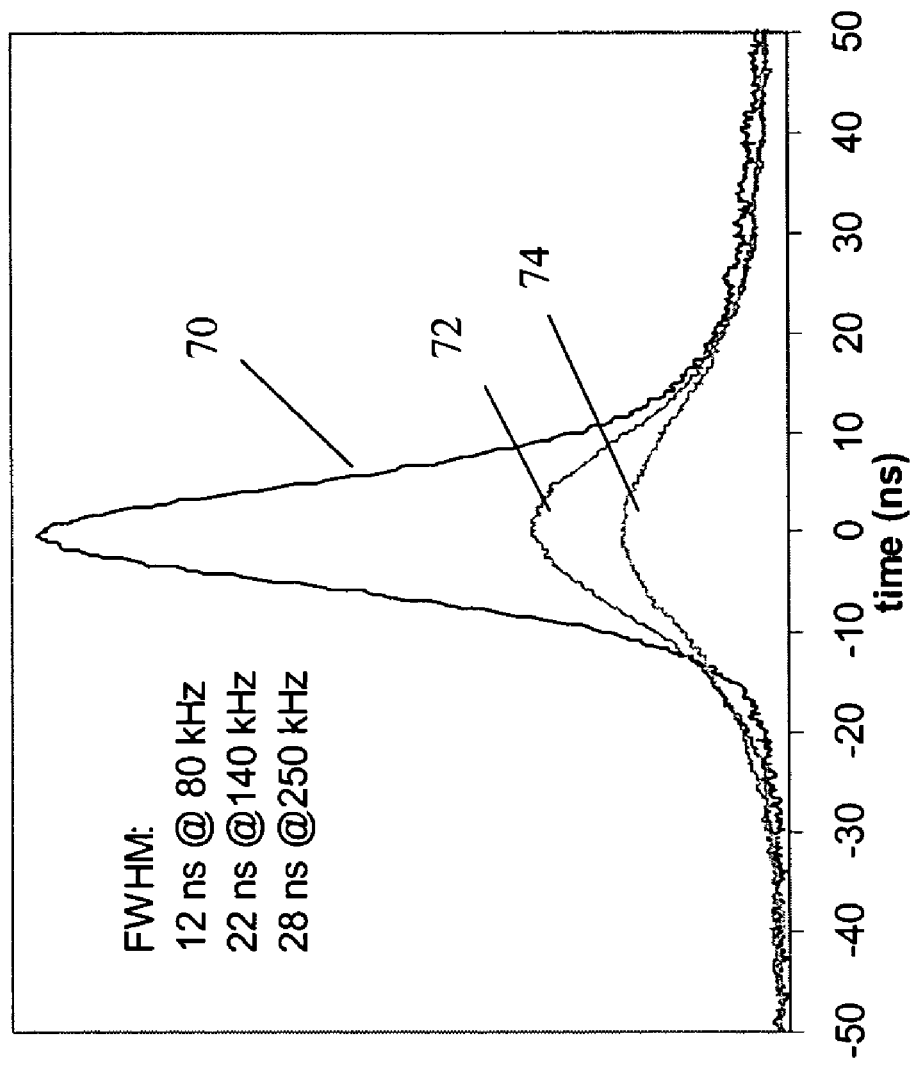
FIG. 7 is a plot of typical pulse shapes of the Q-switched laser.

Typical pulse shapes for the all-fiber Q-switched laser 50 are show in FIG. 7. A 0.3 µJ pulse 70 having a 12-ns full-width half-maximum (FWHM) and a repetition rate of 80 kHz has been demonstrated with 370 mW of pump power and produced 25 W of peak power without using an amplifier. Pulses 72 having a 22 ns FWHM and a repetition rate of 140 kHz and pulses 74 having a 28 ns FWHM and a repetition rate of 250 kHz have also been demonstrated. The power density of pulse 70 is close to 100 MW/cm$^2$. The pulse energy can be increased significantly when the laser is operated at a lower repetition rate. The peak power density can be readily increased to close to 5 GW/cm$^2$, which is the physical break down power density of silica fibers.

The fiber-laser-based implementation of a Terahertz source through difference frequency generation (DFG) by nonlinear optical (NLO) crystals using high power Q-switched 1.55-micron or 1-micron fiber lasers provides a number of benefits.

1. Ultra Narrow Linewidth, Long Coherence

The Q-switched fiber laser operates in a robust single longitudinal mode with a narrow linewidth <10 kHz and preferably <1 kHz (when it is operated in CW), which corresponds to >300 km in coherence length, with an innovative active Q-switch mechanism added from outside to part of the fiber cavity. Such narrow linewidth/long coherence length is not available by any other THz generation approaches. This feature will provide revolutionary technology benefits for coherent detection.

2. Diffraction Limited Beam

Collinear phase matching is used to generate THz radiation, i.e. the input and output beams propagate in the same direction and the relative phases between the beams does not change significantly through propagation. Since only non-linear processes are involved, the generated THz source beam will easily retain the diffraction-limited beam nature of the fiber lasers. Single-mode fiber lasers have shown the highest beam quality ($M^2$<1.05) or smallest beam divergence in known lasers. Such diffraction-limited beam can be manipulated by subsequent optics to achieve long standoff range with ultimate high spatial resolution.

3. Compactness

The laser cavity length of the Q-switched fiber lasers is <10 cm and suitably 2–5 cm. As described in the copending application, the whole laser cavity can be placed in a miniature vibration-and-acoustic isolated enclosure with built-in temperature and electronic control interface. With the addition of about 10-mm long nonlinear optical crystals and auxiliary optics for focusing, collimating and filtering, the whole system will be very small and easy for integration since most components are fiber-based.

4. Scalability

The scalability of the fiber-laser-based THz sources is manifest in two aspects. One is that it is scalable in output power. The output power of the fiber lasers can be readily increased by commercially available rare-earth-doped fiber amplifiers. The output power of generated THz sources is only limited by the physical break down threshold of silica fibers and nonlinear optical crystals. The power density and average power of the fiber laser can be 5 GW/cm$^2$ and 100 W respectively with current fiber amplifier technology. THz sources with peak power of a few kilo Watts and average power more than 100 mW can be achieved with required pump laser power density still less than material physical break down.

Furthermore, the THz source can be scaled to THz source array. With most components of the THz source being fiber-based, its compactness and flexible fiber management can be fully exploited to form an array of THz sources in either one or two dimensions. To make an array of THz sources even more compact and integrated, a combined output of two Q-switched fiber lasers can be split into N outputs and each output can be amplified and then go through nonlinear optical crystal to generate THz sources through difference frequency generation. Such scalability in both directions does not exist and cannot be evolved from any existing technology without overcoming some fundamental limits.

5. Portability

The described Q-switch fiber laser weighs only about 400 grams. The majority of the weight comes from the laser housing, which can be modified to accommodate two fiber lasers and additional THz generation parts. Portability can be readily achieved.

6. Spectral Agility

Spectral agility of the THz source can be realized by tuning one or both of the fiber lasers by stretching the fiber gratings thermally or piezoelectrically through attached piezo actuators as illustrated in the described Q-switched laser. Especially when piezo tuning is engaged, very fast tuning can be realized. Piezo actuators with resonance frequency >300 kHz are available on the market. In general practice, ⅓ of the resonance frequency can be used to drive the actuators, i.e. >100 kHz (or <10 μs) tuning speed can be achieved.

7. High Energy Efficiency

Nonlinear process efficiency relies highly on pump power density and spatial and temporal overlap of involved beams. Single mode fibers are ideal optical media to confine and deliver laser beams because of their small core sizes. For example, 30 W peak power of the fiber laser in 6-μm-diameter fiber results in >100 MW/cm$^2$ power density. The peak power can be increased to greater than 100 W by optimizing the laser cavity design, and further increased to 3 kW with a fiber amplifier to reach a power density of 5 GW/cm$^2$ or the physical break down power density of silica fibers. Spatially, two fiber lasers can be combined into one single-mode fiber to achieve perfect spatial overlap. Once fiber length is fixed, the light traveling time through the fiber can be predetermined so that the active Q-switch of the two fiber lasers can be precisely timed to realize the best possible temporal overlap. By choosing the two fiber lasers at the each end of the 1.55-micron fiber communication C-band, THz radiation at a wavelength of 40 micron will be generated.

8. Easy to Maintain

Fiber-based products share one distinctive feature that other technologies rarely possess: only minimum maintenance is required. Splices have replaced otherwise painstaking free-space alignments. Very reliable and robust THz sources are made possible.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A Terahertz (THz) source, comprising:
   A THz generator head including a nonlinear optic (NLO) crystal;
   A first fiber laser configured to generate a first laser output at a frequency ω1;
   A second fiber laser configured to generate a second laser output at a frequency ω2; and
   A beam combiner configured to combine the first and second laser outputs and routes the combined output to the THz generator head where a nonlinear interaction process in the NLO crystal generates THz radiation that is output from the head.

2. The THz source of claim 1, wherein the beam combiner is spliced between the first and second fiber lasers and the THz generator head.

3. The THz source of claim 1, wherein said first and second fiber lasers are Q-switched fiber lasers.

4. A THz source of claim 1, wherein said first and second fiber lasers generate first and second single-longitudinal mode laser pulses.

5. A Terahertz (THz) source comprising:
   First and second Q-switched fiber lasers configured to generate first and second laser pulses at frequency ω1 and ω2, respectively, where each said Q-switched fiber laser, comprises:
   a polarization-dependent resonant cavity including a fiber chain having a gain medium between narrowband and broadband fiber gratings;
   a pump source that couples energy into the fiber chain to pump the gain medium; and
   a modulator that applies stress to the fiber chain to induce birefringence and switch the cavity Q-factor to alternately store energy in the gain medium and then release the energy of the laser output in a laser pulse; and
   A beam combiner configured to combine the first and second laser pulses and routes the combined output to the THz generator head where a nonlinear interaction process in the NLO crystal generates THz radiation that is output from the head.

6. The THz source of claim 5, wherein at least a portion of the fiber chain comprises a polarization-dependent fiber.

7. The THz source of claim 5, wherein the narrowband fiber grating is formed in a polarization maintaining (PM) fiber creating a pair of reflection bands that correspond to different polarization modes, said broadband grating having a reflection band that is aligned to one of the narrowband grating's reflection bands.

8. The THz source of claim 5, wherein the modulator comprises a piezoelectric transducer (PZT).

9. The THz source of claim 5, wherein the laser pulse is single-longitudinal mode.

10. The THz source of claim 5, wherein the modulators of the first and second Q-switch fiber lasers are timed so that their laser pulses line up temporally.

11. The THz source of claim 5, wherein the first and second Q-switched fiber lasers generate laser pulses at wavelengths at opposite ends of the C-band.

12. A Thz source of claim 5, wherein at least one of said fiber gratings and said gain medium is formed in a non-polarization maintaining (PM) fiber and said modulator is configured to apply stress to a non-PM portion of the fiber chain.

13. A THz source of claim 12, wherein the induced birefringence has polarization axes in the cross-section of the stressed fiber chain.

14. A Terahertz (THz) source, comprising:

A THz generator head including a nonlinear optic (NLO) crystal;

A first Q-switched fiber laser configured to generate a first laser pulse at a frequency $\omega 1$;

A second Q-switched fiber laser configured to generate a second laser pulse at a frequency $\omega 2$, said first and second Q-switched fiber lasers being configured so that their laser pulses overlap temporally; and A beam combiner configured to combine the first and second laser pulses and routes the combined output to the THz generator head where a nonlinear interaction process in the NLO crystal generates THz radiation that is output from the head.

15. A THz source of claim 14, wherein said first and second laser pulses are single-longitudinal mode.

16. A THz source of claim 14, wherein said Q-switched fiber lasers are polarized.

17. A THz source of claim 14, wherein at least one of said first and second Q-switched fiber laser is configured for tuning to tune the frequency of the THz radiation output from the head.

* * * * *